July 6, 1937.  J. C. WILLIAMS  2,085,777
PRESSURE BALANCE SEALED BEARING
Filed March 27, 1935  2 Sheets—Sheet 1

INVENTOR.
John C. Williams

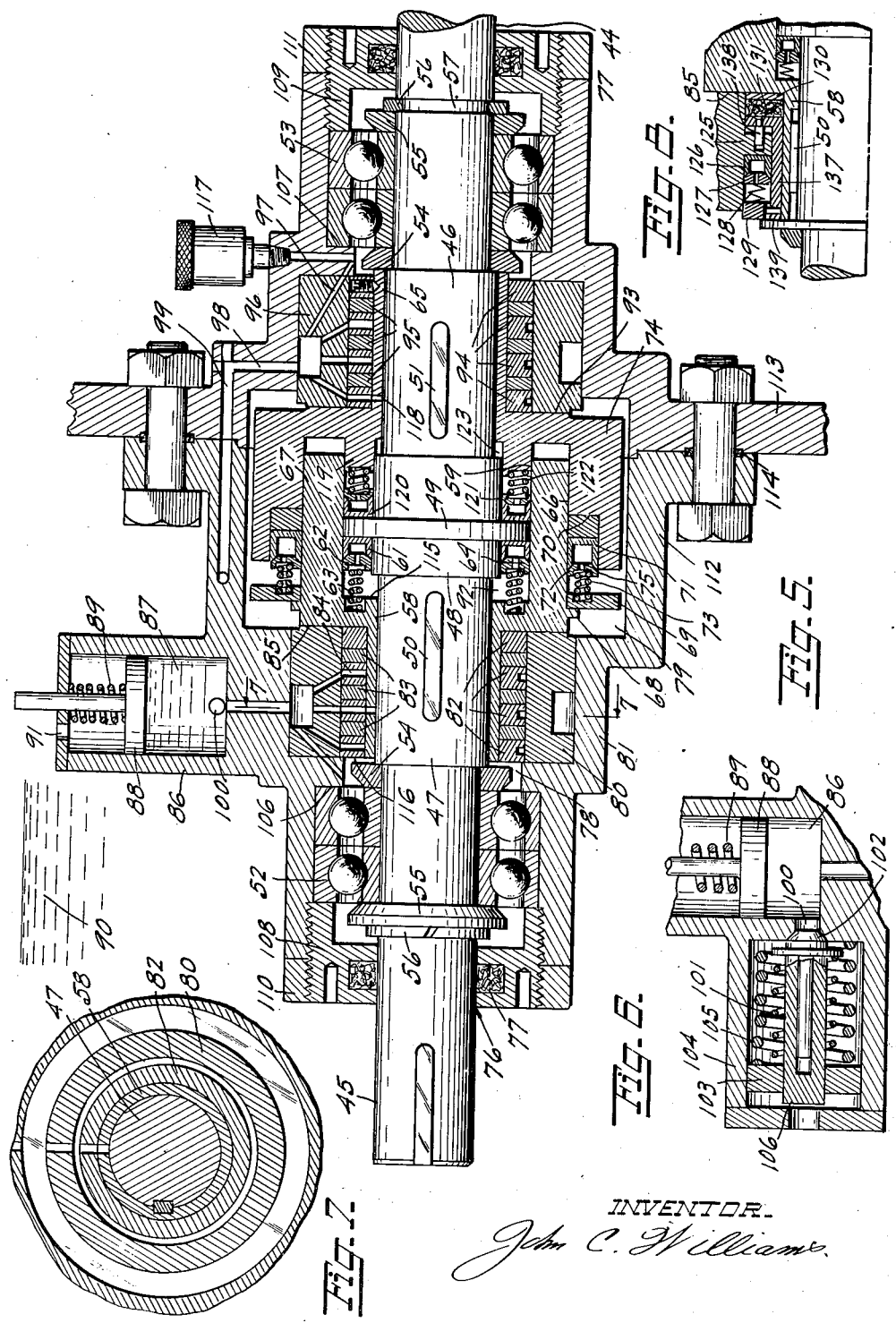

Patented July 6, 1937

2,085,777

UNITED STATES PATENT OFFICE 2,085,777

PRESSURE-BALANCE SEALED BEARING

John C. Williams, Oakland, Calif., assignor to John C. Williams Corporation, a corporation of Nevada Application March 27, 1935, Serial No. 13,313

5 Claims. (Cl. 286—9)

This invention, a pressure-balance sealed bearing, is directed in part to a continuation of application Serial No. 717,808, filed March 28, 1934, and which covers a Method of, and device for deep-sea dredging.

In deep-sea dredging, it is impractical to use prime movers located above the surface of the water for operating the dredge. It is necessary that the dredge be complete as to all mechanism including the prime movers, and that the dredge be raised and lowered by flexible means, such as a cable, since undercurrents and the wash of the waves would bend and break any rigid connection between the surface and the dredge being lowered to, or raised from, a sub-sea surface.

This invention provides a seal about projecting shafts operated by a prime mover, such as an electric motor operating within an otherwise sealed enclosure, against hydrostatic heads of unusual magnitude, and makes possible the dredging of sub-sea surfaces which have been hitherto impossible, since, for the reasons previously stated, conveying pipes or conduits are impractical, and only moderate water depths could be withstood by the sealing methods in use.

No practical means for sealing bearings against hydrostatic heads of great magnitude has been previously advanced. Some types operate fairly satisfactory under hydrostatic heads of a few hundred feet but are useless at depths of one thousand feet or over, and when water to any extent enters the submerged motor enclosure, the motor is ruined.

This invention has been tested under a hydrostatic head of fifteen hundred feet with the entire exclusion of water attempting ingress about the shaft, and is therefore ideally adapted to deep-sea dredging, as also for submarines, salvaging, and related devices, and can also be used in connection with rock borers, mine pumps, and saws for cutting submarine growths.

The main difficulty in submarine dredging has been in the provision of suitable shaft seals, and this invention effectively seals the shaft and its bearings against any external hydrostatic pressure.

The objects of the invention are as follows:

First; To provide a method of sealing protruding shafts against hydrostatic heads of great magnitude.

Second; To provide a method which is dependent upon the existing hydrostatic pressure for suitably balancing the seal against the existent external pressure.

Third; To seal a prime mover enclosure against hydrostatic heads of any magnitude to prevent ingress of water and consequent damage to the prime mover.

Fourth; To balance and actuate the sealing means through the medium of the existent hydrostatic head.

Other objects and advantages of the invention will become apparent as the following description is read on the drawings forming a part of this specification, and in which similar reference characters are used to designate similar parts throughout the several views, of which;

Fig. 5 is another very efficient modification of the invention, shown in longitudinal section.

Fig. 6 is a section through the grease supply means.

Fig. 7 is a section taken on line 7—7 of Fig. 5.

Fig. 8 is a further modification of the seal, shown in section, fragmentarily.

Figure 1:
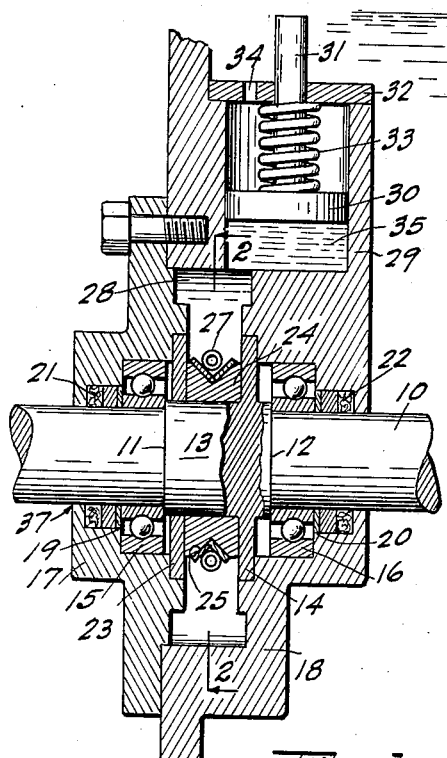
Fig. 1 is a sectional elevation through the original form of the invention.

In detail, the invention consists in its preferred form of a through or driving shaft 10, which is provided with bearing seating shoulders 11 and 12 formed by the enlargement 13, at one end of which an annular thrust disc 14 is integrally formed, the shaft being rotatably mounted in ball bearings 15 and 16, and the ball bearings being respectively mounted in the head 17 and enclosure wall 18.

The head 17 and enclosure 18 are bored to receive the shaft, and counterbored to receive metal shoulder rings 19 and 20, and resilient packing rings 21 and 22, to form primary seals.

A thrust washer 23 is of the same diameter as the thrust disc 14, and is slidable on the enlarged portion 13 of the shaft.

A resilient collar 24 is interposed between the disc 14 and washer 23, and has an annular V groove 25 formed therein, in which two opposed frusto-conical resilient rings are mounted, and which cooperate with the opposite frusto-conical faces of the V-groove, these rings being split as shown at 26, and being resilient in nature to permit the annularly mounted tension spring 27 to crowd the resilient washer 24 against the faces of the disc 14 and washer 23, and also against the periphery of the shaft.

The disc 14 and washer 23 are respectively rotatable in counterbores formed in the head 17 and enclosure 18, as shown.

An annular chamber 28 is formed within the head 17 and enclosure 18, and communicates with a cylinder 29, in which is slidably mounted, a piston 30, having a piston rod 31 guided through the cylinder head 32, and urged by a spring 33 and subjected to existent external water pressure through the port 34, whereby a supply of fluid, such as grease 35 is constantly urged under predetermined pressure by the spring 33, and variably urged by the existent hydrostatic head of the water 36, into the chamber 28, and between the disc 14, washer 23, and the thrust faces at the bottom of the respective counterbores and including peripheral rotatable cooperation.

Therefore, water urging ingress about the shaft 10 at 37 is balanced by the pressure of the water on top of piston 30, through the port 34, and overbalanced by the excess, normally acting pressure of the spring 33. Any water entering at 37 and passing the packing 21, to pass further, must force its way through the heavy grease, and either pass between the washer 23 and the shaft, or between this washer and the face of the counterbore, and encompassing face, and along the shaft would be blocked by the resilient or rubber interposed compressed sleeve, while its other possible course would be blocked by the heavy grease under greater pressure than the water. Any water passing through the grease would be compelled to pass between the periphery of the disc and the encompassing face, and then between the thrust faces of the disc and counterbore. No water can pass along the shaft, and the pressure of the grease is always greater than the existent hydrostatic head.

The grease can escape from the enclosure or chamber for the seal toward the motor enclosure only through the encompassing and thrust seats of the disc 14, and any passing thereby is further blocked by the packing 22.

For these reasons, the hydrostatic head is balanced, and the normal pressure exerted by spring 33 overbalances the water pressure, and therefore, only this normal spring pressure acts to lubricate the bearing 15 irrespective of the hydrostatic head.

Figure 3:
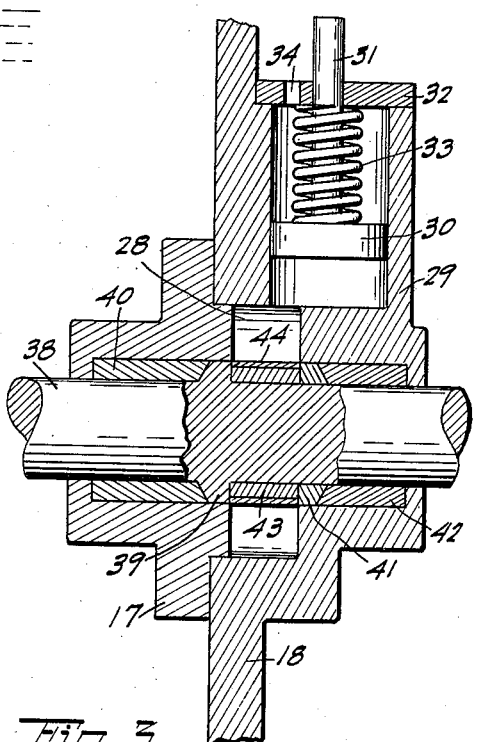
Fig. 3 is a sectional view through a modified form of the invention.
Figure 2:
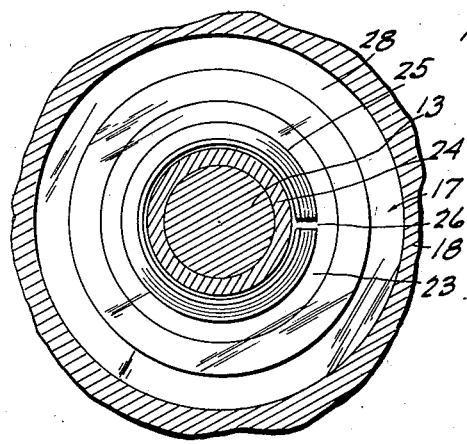
Fig. 2 is a section taken on line 2—2 of Fig. 1.

In Fig. 3 is shown a modification in which the shaft 38 is provided with an integral chamfered thrust collar 39 cooperating with the complementary face of a bearing bushing 40, and a chamfered sliding collar 41 cooperates with the complementary face of a second bushing 42, a resilient collar 43 being interposed between the collars 39 and 41 and being compressed by a resilient split encompassing ring or clamp 44, this type of seal being satisfactory for medium depths, but not as suitably for extreme depths as that shown in Figs. 1 and 2.

In Fig. 5 is shown another modification which is especially effective against extreme hydrostatic heads, and which will effectively seal against heads of two thousand feet, and is therefore of supreme advantage in connection with diving bells, deep-sea dredges, submarines, and related devices.

The driving end 44 of the shaft extends into the sealed enclosure and is connected to a motor, (not shown), while the driven end 45 is exposed to the existent hydrostatic head. The shaft is stepped from each end, the drive end having a step 46, and the driven end, a step 47 of equal diameter to the step 46. A second step or enlargement 48 is formed between the steps 46 and 47, and an annular integral collar 49 is formed intermediate the length of the enlargement 48. Suitable keys 50 and 51 are mounted in the steps 46 and 47.

The shaft is rotatably mounted in suitable bearings, such as ball bearings 52 and 53, the inner races of which are secured between the end rings 54 and 55, the assemblage of bearings and rings being retained in fixed position on the shaft against the shoulders of the steps by means of spring rings 56 which are sprung into the annular grooves 57.

Slidably mounted on the step 47 is a combined piston and cylinder, the hub 58 of which is keyed on the shaft as indicated at 50 for sliding movement on the step 47, and it has a bore 59 in which the collar 49 is slidable and acts as a piston therein.

Sealing means between the step 48 of the shaft and the cylinder bore 59 consists of a leather U-washer 61 which cooperates with the front face of collar 49, the legs of the washer being spread by means of a double chamfered ring 62, which is urged by means of the springs 63 cooperating with the bottom of the bore 59, suitable seats being provided for the springs in both, the washer 62 and end wall of the bore.

Thus, the springs 63 urge the washer 62 to spread the U-packing against the periphery of the enlargement 48 and walls of the bore 59, and passages 64 permit the water or grease to enter the annular cavity in the U-packing, spreading the concentric walls to full cooperation and thorough sealing. Therefore, the further progress of water is fully blocked at the seal 61.

Slidably mounted on the step 46 is a cylinder, the hub 65 of which is keyed as indicated at 51 for sliding movement on the step 46, and this cylinder has a bore 66 slidably receiving the piston 67, which in turn is provided with an annular flange 68, which acts as a shoulder for the spring thrust ring 69.

An annular recess or counterbore 70 is formed in the cylinder, and suitable packing including a leather U-washer 71 is fitted within this counterbore. A double chamfered washer 72 urged by springs 73 spreading the legs of the washer to cooperate with the respective outer periphery of the piston-cylinder 67 and cylinder 74, passages 75 permitting water of ingress or grease to enter the annular cavity in the leather U-washer and urging the washer into full cooperation, effectively sealing against creep of water between the cylinder and piston.

Thus, water attempting ingress at 76 is first restrained by the packing 77, and any passing thereby will freely pass through passage 78, then creep along between shaft enlargement 47 and hub 58, being fully sealed by packing 61.

Coincidently, water will attempt passage from passage 78 to chamber 79, therefore, a concentric insert 80 is pressed into housing 81 and a plurality of alternate metal and resilient compressible packing rings, such as rubber or wicking, fit between the bore of the insert and the external periphery of the hub 58.

In all except the innermost of the metal rings, a grease passage 84 is provided to keep the resilient packing rings saturated with grease under a pressure above that of the hydrostatic head.

A thrust seal is provided at 85 between the inner end of the insert, and outer end of the piston 67, which in combination with the packing rings 82—83 form the two series steps of one leg of the primary seal, while the packing 61 forms the other leg, forming two seals in parallel to form the primary seal.

Communicating with the respective passages 84 is a cylinder 86 having a supply of grease 87 urged through a piston 88, normally by a spring 89 under predetermined pressure and under pressure of the hydrostatic head of water 90 through passage 91, whereby the pressure of the grease through passages 84 is always of a predetermined value above the external pressure of the water, therefore, just sufficient pressure is maintained at all times irrespective of degree of submergence to constantly feed lubricant to the various bearing surfaces and react excessively against the pressure of the water urging ingress at 76. Thus, the floating metal and resilient packing rings 82 and 83 in conjunction with the excessively urged grease effectively seal against passage of water to the chamber 79.

However, the additional thrust seal is provided at 85, and some water will pass to the chamber 92, equalizing the pressure at the opposite ends of the piston, since the projected area of the thrust responsive surfaces is equal, and the effective reaction on thrust face 85 is through the medium of the springs 63, which are comparatively light.

Should any water pass between the packing 82—83 and the respective walls of the shaft or hub and insert and thence between the thrust faces 85 to chamber 79, it would be blocked by the parallel legs of the secondary seal, being blocked from passage back to the shaft by packing 71 forming one leg of the secondary seal, and thrust face 93 and packing 94—95 which cooperates with the insert 96 forming the other leg, the elements 93 to 96 being similar in structure and function to the elements 80, 82, 83 and 85, but complementarily operative.

The grease to the secondary seal is fed similarly to the foregoing through passages 97, 98 and 99 from the cylinder 86, but is controlled as to pressure by the hydrostatic head, the grease passing through passage 100 which is controlled under normal predetermined pressure of a spring 101 by a valve 102, the spring normally maintaining the valve closed when there is no reactional pressure, but being overcome by the pressure of the spring 89 to normally feed grease to the bearings and seals.

Any pressure of water exerted on piston 88 is equally exerted on piston 103 in cylinder 104, urging the piston 103 to compress the spring 105, increasing the tension of spring 101 by compression to reduce the pressure of the grease to the inner elements, the pressure of the water coincidently acting on plunger 106, equalizing the pressure exerted by the water on the grease and permitting only the differential pressure on the springs 89 and 101 to act to force the grease to passages 97 and coincidently to the respective inner-portion bearings and bearing surfaces.

It will be noted that as the piston 103 is urged to compress the spring 105, the tension of spring 101 is increased, reducing the pressure differential between the springs while balancing the hydrostatic pressure, and the greater the hydrostatic head, the lower the pressure of the grease supplied to the secondary seal.

The outer races of the ball bearings are secured between the respective shoulders 106 and 107 by means of the packing glands 108 and 109, which are locked by means of the lock nuts 110 and 111.

The bearing head 112 is bolted to the enclosure 113 as shown and packed against ingress of water as indicated at 114.

It will be noted that the thrust between the faces 85 and 93 is created only by the interposed packing springs and that the pressure of the water has no effect on the thrust, having been equalized or balanced.

From the above description it will be realized that the water pressure is balanced between the various reactive surfaces of the sealing means, as on the opposite faces 115 and 116, which are equal, that the springs 63 and 73 maintain predetermined thrust between the cooperative faces respectively, 85 and 93, that the pressure of the water is equalized by the pressure of the grease up to the terminal 85 of the primary seal and overcome by excess pressure created by the spring 89, and that the pressure of the grease to all other points is balanced under predetermined pressure when a specific predetermined depth of submergence is attained.

It will be noted that the cooperative thrust faces are provided with grease under predetermined pressure below that of the water of submergence and that lubricating means 117 operable and adjustable at will is also provided.

The grease under predetermined lower pressure introduced to the shaft 118 lubricates the various elements inwardly of the shaft collar, and a piston 119 integral with cylinder 74 cooperates between the enlargement 48 and piston 67, and reverse packing including the U-washer 120, spreading ring 121, and springs 122 provide an opposed seal at the collar 49, the pressure of any back-creep water or low pressure grease passing into the chamber 123 being blocked by this seal, forming a tertiary seal.

It will be noted that pressure transmitted from 76 to 78 is transmitted to the surface 116, compressing the packing rings to block passage to the thrust seal 85. Coincidently, since no effective seal is introduced along the shaft portion 45 or 47, water will creep to chamber 92 creating a counter-thrust on surface 115, thus equalizing the hydrostatic head to this point, since an effective seal is provided at 61, and without the springs, the piston would merely float, however the springs maintain the thrust faces 85 in contact under predetermined pressure, and all thrust of the water has been transmitted to the shaft which thrust is absorbed by the bearings.

Figure 4:
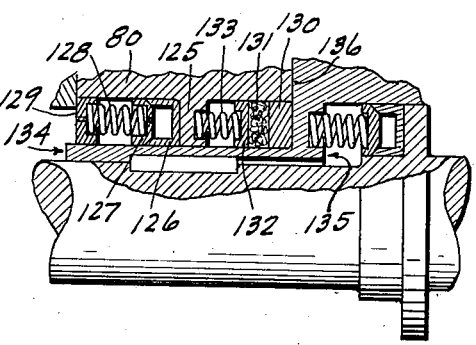
Fig. 4 is a further modification of the invention, fragmentarily shown in section.

In Fig. 4, a modification of the packing 82—83 is shown, and consists of an inwardly projecting annular collar 125 which is integral with the insert 80 and formed intermediate the length thereof. A U-washer 126 with spreader 127, springs 128 and spring ring 129 replaces some of the elements 82—83, and a thrust ring 130, packing ring 131, spring ring 132, and springs 133 replace the balance of the elements 82—83.

As will be noted, the pressure at 134 and 135 are equalized similarly to that in Fig. 5. However, instead of transmitting the pressure 134 to the shaft, this pressure is absorbed by the collar 125, and this coincidently removes the thrust from the face 136.

The modification shown in Fig. 8 is extremely effective and very simple, and consists of the previously recited thrust face 85 and hub 58 which is keyed at 50, the piston cylinder having the same form as that shown in Fig. 5. The insert 125 is similar to that in Fig. 4, as is also the U-washer 126, thrust ring 127, springs 128 and spring collar 129 and bearing collar 130. The difference lies in the individual collared sleeve 137 which is secured against rotation as by the key pin 138.

In this arrangement, hub 58 turns with the shaft and within the sleeve 137. Since the pressure of the water can only act on the reduced area 139 of the sleeve, the unit pressure on the packing is proportionately reduced, since the major portion of the pressure is absorbed by the collar 125. In addition, the differential area between the faces 115 and 139 may be made to any predetermined value to provide the exact thrust operating to the best advantage. In this arrangement, the reactive thrust may be made to any degree above or below the active thrust at 139.

It will be noted particularly that in all cases, any water passing the first seals, must next pass through a thrust face with centrifugal action, and then follow through a second thrust face, (as 93) against centrifugal action.

It is known that U-washers have been used for packing rams in hydraulic presses and accumulators. However, these devices do not rotate, and therefore would not be applicable to a rotating shaft. This invention utilizes this principle in a related manner only, and not directly as in the above devices, therefore advancing a new principle in the use thereof.

It will be understood that variations in the construction and arrangement of parts, or in the method or steps thereof, which variations are consistent with the appended claims, may be resorted to, without detracting from the spirit or scope of the invention, or sacrificing any of the advantages thereof.

I claim:

1. A shaft seal comprising in combination with a housing, a shaft having an annular collar, a pair of cooperating, opposed seal members rotatable with and slidable on said shaft and forming interiorly an annular recess on each side of said collar; a sealing element in each recess resiliently urged into cooperation with the respective sides of said collar and with the peripheral walls of said recesses and said shaft and forming a seal against passage of fluid about said collar; resiliently urged sealing elements cooperating between said seal members while permitting axial movement of one relative to the other; a thrust seal face formed on each seal member in opposition; and complementary thrust seal faces formed in said housing, said recesses having a thrust face area equal to the pressure exposed area of said seal members, whereby fluid under pressure reaching said recesses along said shaft will balance the pressure of said fluid on the fluid exposed end of either of said sealing members.

2. A shaft seal comprising a housing having an internal sealing chamber provided with opposed thrust seal faces, a shaft rotatable in said housing and having an integral annular collar, opposed, cooperative sealing members in said chamber slidable one relative to the other and having each a seal face for cooperation with the respective seal faces in said chamber, sealing means between said members, an internal annular recess formed in one of said members and forming a recess on each side of said collar, resilient sealing means in said recess on each side of said collar and cooperating respectively with the side walls of said collar and with said shaft and peripheral walls of said recess.

3. A shaft seal comprising a housing having an internal chamber provided with opposed seal thrust faces and an axial bore, a shaft rotatable in said bore; cooperative, opposed, resiliently urged sealing members having each an end thrust seal face respectively cooperating with the respective opposed seal thrust faces, and individually slidably and non-rotatably mounted on said shaft, resilient sealing means between said members, and resilient sealing means between said members and said shaft.

4. A shaft seal comprising a housing having a chamber formed therein and provided with opposed end thrust faces, cooperative opposed, resiliently urged sealing members having each an end thrust face, a shaft having a collar formed thereon, said sealing members being individually slidable and non-rotatable on said shaft, sealing means between said members, and sealing means between said members and said collar, said sealing members each having a hub, a series of alternate metal and resilient rings on each hub, one terminal ring of each series being fixed to the hub, the other terminal ring of each series cooperating with the inner portion of the respective opposed end thrust faces, and means feeding lubricant under high pressure to alternate rings of each series.

5. A shaft seal comprising a housing having internal opposed thrust seal faces, a shaft having an annular collar, opposed resiliently urged seal members straddling said collar, and sealing means between said collar and said members, and sealing means between said members, and a thrust seal face on each member.

JOHN C. WILLIAMS.